United States Patent
Wang et al.

(10) Patent No.: US 10,174,965 B2
(45) Date of Patent: Jan. 8, 2019

(54) METHODS AND APPARATUSES FOR SWITCHING STATE

(71) Applicant: Xiaomi Inc., Beijing (CN)

(72) Inventors: Yang Wang, Beijing (CN); Qiang Fu, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 289 days.

(21) Appl. No.: 14/982,760

(22) Filed: Dec. 29, 2015

(65) Prior Publication Data

US 2016/0258646 A1    Sep. 8, 2016

(30) Foreign Application Priority Data

Mar. 2, 2015    (CN) .......................... 2015 1 0093411

(51) Int. Cl.
*G05B 15/02* (2006.01)
*F24F 11/62* (2018.01)
*F24F 11/30* (2018.01)
*G05B 19/042* (2006.01)
*G05D 7/06* (2006.01)
(Continued)

(52) U.S. Cl.
CPC ............. *F24F 11/62* (2018.01); *F24F 11/30* (2018.01); *G05B 15/02* (2013.01); *G05B 19/0425* (2013.01); *G05D 7/06* (2013.01); *F24F 11/52* (2018.01); *F24F 11/66* (2018.01); *H01H 9/22* (2013.01)

(58) Field of Classification Search
CPC ....... F24F 2011/0068; F24F 2011/0064; F24F 3/16; G06F 1/26

USPC .......................... 700/275, 295, 297
See application file for complete search history.

(56) References Cited

U.S. PATENT DOCUMENTS 7,843,425 B2 * 11/2010 Lu ........................... G06F 3/011
                                                      341/20
2005/0018700 A1    1/2005 Lumsden
(Continued)

FOREIGN PATENT DOCUMENTS

CN        101072308 A      11/2007
CN        101399675 A      4/2009
(Continued)

OTHER PUBLICATIONS

Purdue University, Control of Hazardous Energy Program (Lockout/Tagout), May 1990, Revised Sep. 2013, 24 pages.
(Continued)

*Primary Examiner* — Michael J Brown
(74) *Attorney, Agent, or Firm* — Arch & Lake LLP

(57) ABSTRACT

The present disclosure relates to methods and apparatuses for switching an operation state of a target device such as an air purifier. The method includes acquiring a state switching instruction based on an input from a micro-switch of the air moving device, switching a current state of the target device from an in-operation state to an out-of-operation state based on the state switching instruction, maintaining the target device in the out-of-operation state until acquiring a predetermined wakening instruction, acquiring a predetermined wakening instruction, and switching the air moving device from the out-of-operation state to the in-operation state responsive to the acquired predetermined wakening instruction.

20 Claims, 4 Drawing Sheets

(51) Int. Cl.
  *F24F 1/00*  (2011.01)
  *F24F 13/00*  (2006.01)
  *F24F 11/52*  (2018.01)
  *F24F 11/66*  (2018.01)
  *H01H 9/22*  (2006.01)

(56) References Cited

U.S. PATENT DOCUMENTS

| | | | | |
|---|---|---|---|---|
| 2005/0178539 | A1* | 8/2005 | Rotta | B64D 45/00 |
| | | | | 165/235 |
| 2008/0206092 | A1* | 8/2008 | Crapser | A47L 11/24 |
| | | | | 422/5 |
| 2010/0095844 | A1* | 4/2010 | Gilleland | A61L 9/20 |
| | | | | 95/148 |
| 2012/0296448 | A1 | 11/2012 | Balentine et al. | |
| 2015/0058773 | A1* | 2/2015 | Sasaki | G06F 3/04817 |
| | | | | 715/769 |

FOREIGN PATENT DOCUMENTS

| | | |
|---|---|---|
| CN | 101436097 A | 5/2009 |
| CN | 101453549 A | 6/2009 |
| CN | 101907918 A | 12/2010 |
| CN | 102255280 A | 11/2011 |
| CN | 102622079 A | 8/2012 |
| CN | 102734876 A | 10/2012 |
| CN | 103150050 A | 6/2013 |
| CN | 103810971 A | 5/2014 |
| CN | 103851747 A | 6/2014 |
| CN | 103973527 A | 8/2014 |
| CN | 104197482 A | 12/2014 |
| CN | 203980558 U | 12/2014 |
| CN | 204070559 A | 1/2015 |
| CN | 104333785 A | 2/2015 |
| CN | 104808522 A | 7/2015 |
| GB | 2513709 A | 11/2014 |
| JP | H07133930 A | 5/1995 |
| JP | H0835717 A | 2/1996 |
| JP | H10328447 A | 12/1998 |
| JP | H11156237 A | 6/1999 |
| JP | 2000082352 A | 3/2000 |
| JP | 2002129621 A | 5/2002 |
| JP | 2003185248 A | 7/2003 |
| JP | 2004273077 A | 9/2004 |
| JP | 2005175625 A | 6/2005 |
| JP | 2008-175458 A | 7/2008 |
| JP | 2009063252 A | 3/2009 |
| JP | 2013239831 A | 11/2013 |
| KR | 20130013687 A | 2/2013 |
| RU | 2413306 C2 | 2/2011 |
| WO | 2010013413 A1 | 2/2010 |
| WO | 2016138769 A1 | 9/2016 |

OTHER PUBLICATIONS

State Intellectual Property Office of the People's Republic of China, First Office Action, Application No. 201510093411.4, dated Feb. 6, 2017.
European Patent Office, Extended European Search Report, Application No. 15202493.1, dated Jun. 24, 2016.
European Patent Office, Communication, Application No. 15202493.1, dated May 15, 2017.
Japan Patent Office, Notification of Reasons for Refusal, Application No. 2017-503048, dated Jun. 23, 2017.
Patent Office of the Russian Federation, Office Action, Application No. 2016102941/11, dated Jun. 22, 2017.
International Search Report dated Jan. 27, 2016 for International Application No. PCT/CN2015/093057, 4 pages.
Decision to Grant a Patent (including English translation) issued in corresponding Japanese Application No. 2017-503048 dated Feb. 1, 2018, 5 pages.
Notification of Reason for Refusal (including English translation) issued in corresponding Korean Application No. 10-2015-7036665 dated May 31, 2018, 5 pages.

* cited by examiner

METHODS AND APPARATUSES FOR SWITCHING STATE

CROSS-REFERENCE TO RELATED APPLICATIONS

The present application is based upon and claims priority to Chinese Patent Application No. 201510093411.4, filed Mar. 2, 2015, the entire contents of which are incorporated herein by reference.

TECHNICAL FIELD

The present disclosure generally relates to the technical field of terminals, and more particularly, to methods and apparatuses for switching a state.

BACKGROUND

An air purifier is also referred to as an air cleaner, which is capable of absorbing, decomposing or transforming various particles in the air and effectively improving cleanliness of the air and the air quality of the living environment. With the increasingly serious air pollution, the air purifier has become an indispensable domestic appliance in daily life.

The air purifier which operates under a high voltage generally has a large power consumption. When the air purifier is under an in-operation state, touching or disassembling the air purifier would be fatally dangerous. While for a family having a child, the child would possibly touch or try to disassemble the air purifier under curiosity. Then, the air purifier under an in-operation state would possibly injure the child. Conventionally, in order to avoid this, the air purifier would be switched from the in-operation state to an out-of-operation state by touching an on/off switch on the air purifier to turn off the air purifier.

SUMMARY

According to a first aspect of embodiments of the present disclosure, there is provided a method for switching an operation state of an air moving device. The method includes acquiring a state switching instruction based on an input from a micro-switch of the air moving device, switching a current state of the air moving device from an in-operation state to an out-of-operation state based on the state switching instruction; maintaining the air moving device in the out-of-operation state until acquiring a predetermined wakening instruction, acquiring a predetermined wakening instruction, and switching the air moving device from the out-of-operation state to the in-operation state responsive to the acquired predetermined wakening instruction.

According to a second aspect of embodiments of the present disclosure, there is provided a method for switching a state of an air moving device by a control terminal. The method includes generating a state switching instruction upon detecting that a second option in the control terminal is triggered, sending the state switching instruction to the air moving device such that the target device switches from an in-operation state to an out-of-operation state based on the state switching instruction, receiving a state prompt message sent from the air moving device, prompting based on the state prompt message, generating a predetermined wakening instruction upon acquiring unlocking information input by a user or upon detecting that a fourth option in the control terminal of the air moving device is triggered, and sending the predetermined wakening instruction to the air moving device. The air moving device switching from the out-of-operation state to the in-operation state based on the predetermined wakening instruction.

According to a third aspect of embodiments of the present disclosure, there is provided an apparatus for switching a state of a target device. The apparatus includes a module configured to acquire a state switching instruction based on a sensor of the target device, the sensor detecting a component of the air moving device being removed, a module configured to switch a current state of the target device from an in-operation state to an out-of-operation state based on the state switching instruction, a module configured to maintain the out-of-operation state until acquiring a predetermined wakening instruction, a module configured to acquire the predetermined wakening instruction, and a module configured to switch the target device from the out-of-operation state to the in-operation state responsive to the acquired predetermined wakening instruction.

According to a fourth aspect of embodiments of the present disclosure, there is provided a control terminal, including a module configured to generate a state switching instruction upon detecting that a second option in the control terminal is triggered, a module configured to send the state switching instruction to a target device such that the target device switches a current state of the target device from an in-operation state to an out-of-operation state based on the state switching instruction, a module configured to receive a state prompt message sent from the target device, a module configured to prompt based on the state prompt message, a module configured to generate a predetermined wakening instruction upon acquiring unlocking information input by a user or upon detecting that a fourth option in the control terminal of the target device is triggered, and a module configured to send the predetermined wakening instruction to the target device, the target device switching from the out-of-operation state to the in-operation state based on the particular wakening instruction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
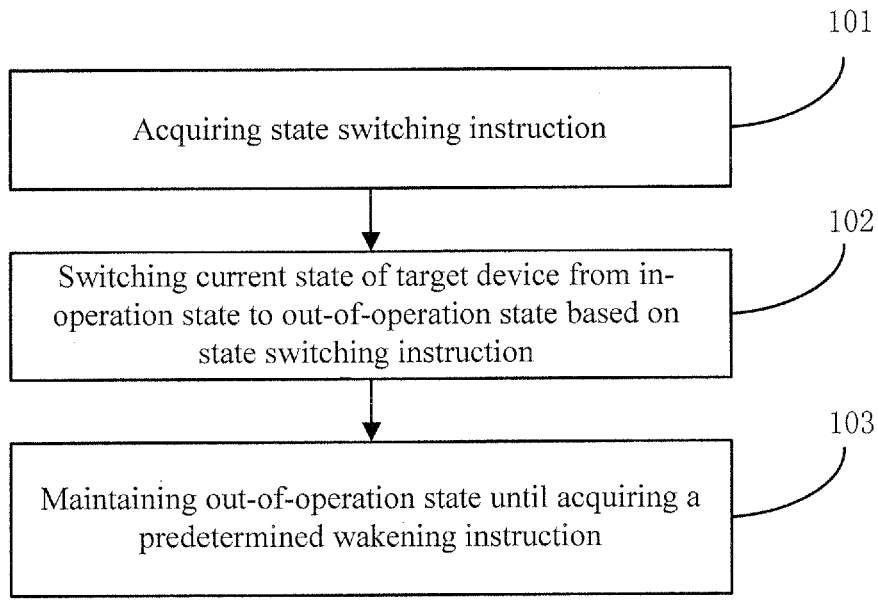
FIG. 1 is a flow chart showing a method for switching a state according to an exemplary embodiment.

FIG. 1 is a flow chart of a method for switching a state according to an exemplary embodiment. As shown in FIG. 1, the method for switching an operation state of a target device, and can include the following steps.

In step 101, a state switching instruction is acquired. In step 102, a current state of the target device is switched from an in-operation state to an out-of-operation state based on the state switching instruction. In step 103, the out-of-operation state is maintained until a predetermined wakening instruction is acquired.

In the method provided by the embodiment of the present disclosure, after a current state is switched from an in-operation state to an out-of-operation state based on the state switching instruction, the out-of-operation state is maintained until a predetermined wakening instruction is acquired, regardless which operating instruction is received. Thereby, it can avoid the situation where the target device is switched back to the in-operation state without an intended operation of the user, and a family member of the user gets injured by the target device. Thus, the security in use of the target device can be improved.

In another embodiment of the present disclosure, acquiring a state switching instruction includes receiving a trigger signal which is sent from a micro-switch on the target device when the micro-switch on the target device is triggered, and generating a state switching instruction based on the trigger signal, or receiving a detection signal which is sent from a sensor on the target device when the sensor detects that a particular component of the target device is removed, and generating a state switching instruction based on a relationship between the instruction and the signal, or generating a state switching instruction upon detecting that a first option on the target device is triggered, or receiving a state switching instruction which is sent from a control terminal of the target device when the control terminal of the target device detects that a second option in the control terminal of the target device is triggered.

Optionally, detecting that a first option on the target device is triggered can be detecting that the user presses down a particular button or a combination of buttons on the target device, detecting that the user presses down a particular button or a combination of buttons on the target device in a particular manner, or the like. Optionally, pressing down a particular button or a combination of buttons on the target device in a particular manner can be pressing down a particular button or a combination of buttons continuously for a predetermined number of times, pressing down a particular button or a combination of buttons for a predetermine time period, or the like.

Optionally, detecting that a second option in the control terminal is triggered can be detecting that the user presses down a particular button or a combination of buttons in the control terminal, detecting that the user presses down a particular button or a combination of buttons in the control terminal in a particular manner. Optionally, pressing down a particular button or a combination of buttons in the control terminal in a particular manner can be pressing down a particular button or a combination of buttons continuously for a predetermined number of times, pressing down a particular button or a combination of buttons for a predetermine time period, or the like.

In another embodiment of the present disclosure, after switching a current state from an in-operation state to an out-of-operation state based on the state switching instruction, the method further includes playing a particular audio file for prompting a user that the target device is currently in the out-of-operation state.

In another embodiment of the present disclosure, after switching a current state from an in-operation state to an out-of-operation state based on the state switching instruction, the method further includes sending state information which indicates that the target device is currently in the out-of-operation state to a server, for the server to store the state information.

In another embodiment of the present disclosure, after switching a current state from an in-operation state to an out-of-operation state based on the state switching instruction, the method further includes sending a state prompt message to a control terminal of the target device, for the control terminal to prompt based on the state prompt message.

In another embodiment of the present disclosure, after switching a current state from an in-operation state to an out-of-operation state based on the state switching instruction, the method further includes acquiring a predetermined wakening instruction, and switching a current state of the target device from the out-of-operation state to the in-operation state based on the predetermined wakening instruction.

In another embodiment of the present disclosure, acquiring a particular wakening instruction includes generating a predetermined wakening instruction upon detecting that a third option on the target device is triggered, receiving a predetermined wakening instruction sent from the control terminal of the target device, the predetermined wakening instruction being generated by the control terminal based on unlocking information input by a user, or receiving a predetermined wakening instruction which is sent from the control terminal of the target device when the control terminal of the target device detects that a fourth option in the control terminal of the target device is triggered.

Optionally, detecting that a third option on the target device is triggered can be detecting that the user presses down a particular button or a combination of buttons on the target device, detecting that the user presses down a particular button or a combination of buttons on the target device in a particular manner, or the like. Optionally, pressing down a particular button or a combination of buttons on the target device in a particular manner can be pressing down a particular button or a combination of buttons continuously for a predetermined number of times, pressing down a particular button or a combination of buttons for a predetermine time period, or the like.

Optionally, detecting that a fourth option in the control terminal is triggered can be detecting that the user presses down a particular button or a combination of buttons in the control terminal, detecting that the user presses down a particular button or a combination of buttons in the control terminal in a particular manner. Optionally, pressing down a particular button or a combination of buttons in the control terminal in a particular manner can be pressing down a particular button or a combination of buttons continuously for a predetermined number of times, pressing down a particular button or a combination of buttons for a predetermine time period, or the like.

The above optional technical solutions can be combined in any manner to form an optional embodiment of the present disclosure, which will not be repeated herein.

Figure 2:
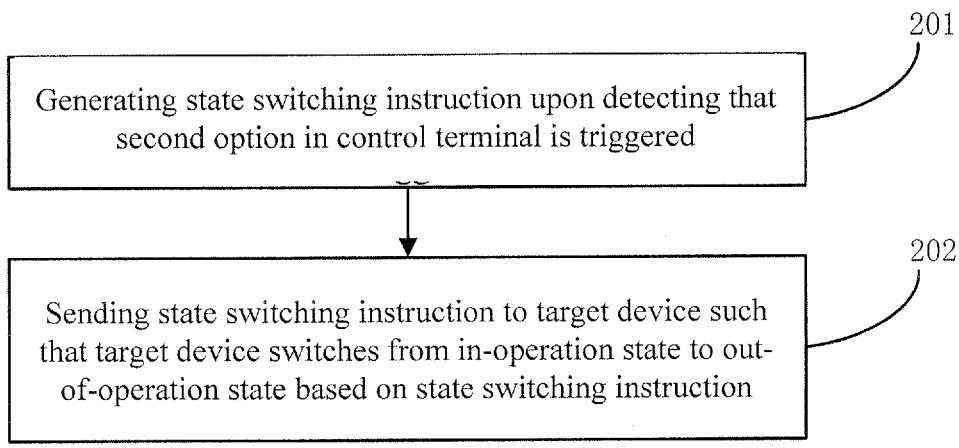
FIG. 2 is a flow chart showing a method for switching a state according to an exemplary embodiment.

FIG. 2 is a flow chart of a method for switching a state according to an exemplary embodiment. As shown in FIG. 2, the method for switching a state of a target device by a control terminal, and can include the following steps.

In step 201, a state switching instruction is generated when it is detected that a second option in the control terminal is triggered.

In step 202, the state switching instruction is sent to a target device such that the target device switches a current state from an in-operation state to an out-of-operation state based on the state switching instruction.

In the method provided by the embodiment of the present disclosure, a state switching instruction is generated when it is detected that a particular option is triggered. The generated state switching instruction is sent to a target device such that the target device switches a current state from an in-operation state to an out-of-operation state based on the state switching instruction. The target device will be maintained in the out-of-operation state until it receives a predetermined wakening instruction, regardless which operating instruction is received. Thereby, it can achieve the control of the state of the target device by means of the control terminal, and the state switching manner can be enriched. Moreover, it can avoid the situation where the target device is switched back to the in-operation state without an intended operation of the user and a family member of the user gets injured by the target device. Thus, the security in use of the target device can be improved.

In another embodiment of the present disclosure, after sending the state switching instruction to a target device, the method further includes receiving a state prompt message sent from the target device, and prompting based on the state prompt message.

In another embodiment of the present disclosure, after prompting based on the state prompt message, the method further includes generating a predetermined wakening instruction upon acquiring unlocking information input by a user or upon detecting that a fourth option in the control terminal of the target device is triggered, and sending the predetermined wakening instruction to the target device such that the target device switches a current state from the out-of-operation state to the in-operation state based on the predetermined wakening instruction.

The above optional technical solutions can be combined in any manner to form an optional embodiment of the present disclosure, which will not be repeated herein.

Figure 3:
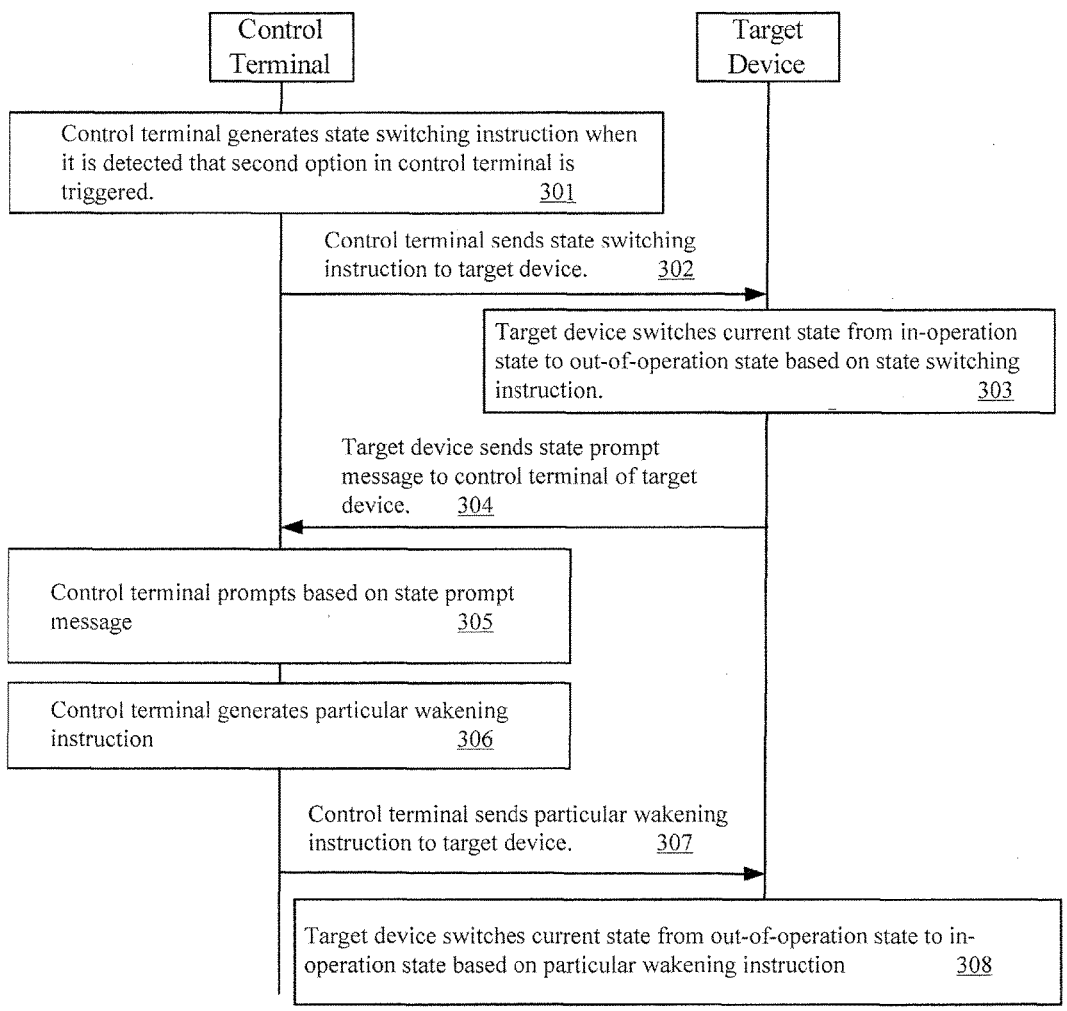
FIG. 3 is a flow chart showing a method for switching a state according to an exemplary embodiment.

FIG. 3 is a flow chart of a method for switching a state according to an exemplary embodiment. As shown in FIG. 3, the method for switching a state is applied in a target device and a control terminal, and for example, the current state is an in-operation state and additionally an out-of-operation state is provided. By switching the target device from the in-operation state to the out-of-operation state, it can effectively ensure security of the lives of the family members of the user. The method provided by the present embodiment can include the following steps.

In step 301, the control terminal generates a state switching instruction when it is detected that a second option in the control terminal is triggered.

Wherein, the control terminal is a control device of the target device, which has an ability to communicate with the target device via a radio frequency method or a network. The control terminal can be one of two kinds, a first kind of which can be a mobile phone, a tablet computer or the like, and a second kind of which can be a remote controller of the target device or the like. When the control terminal is of the first kind, in order to meet the demands of the user, the control terminal is installed with various application programs such as an audio play program, a video play program, an operation control program and the like. In the present embodiment, the application program can be designated as an operation control program for controlling the target device. In order to flexibly control the target device, the application program can be designated as having options such as a "switch off" option, a "restart" option, a "modes" option, etc. A different option can trigger the control terminal to generate a different control command. For example, the "switch off" option can trigger the control terminal to generate a switch-off instruction, the "restart" option can trigger the control terminal to generate a restart instruction, and so on. That is, an option corresponds to an instruction. When the control terminal is of the second kind, various options can be provided on the control terminal, such as a "switch off" option, a "restart" option, etc. Based on these options, it can also achieve control of the target device.

It should be noted that, since the practical application of the method for switching a state provided by the present embodiment involves options of different functions, in order to distinguish these options, in the present embodiment, an option on the target device for controlling the target device to generate a state switching instruction is referred to as a first option, an option in the control terminal for triggering the control terminal to generate a state switching instruction is referred to as a second option, an option on the target device for controlling the target device to generate a predetermined wakening instruction is referred to as a third option, an option in the control terminal for triggering the control terminal to generate a predetermined wakening instruction is referred to as a fourth option, and an option on the control terminal to trigger popping out of an unlocking dialog box is referred to as a fifth option. The above terms of first option, second option, third option, fourth option and fifth option do not indicate the sequence of the options on the devices, but merely for distinguishing the functions and the devices to which the options pertain.

When it is detected that the second option is triggered, the control terminal generates a state switching instruction based on a corresponding relationship between the option and the instruction. The state switching instruction is for controlling the target device to switch the current state from the in-operation state to the out-of-operation state. The control terminal detects that the second option is triggered in a manner including but not limited to: when a user performs a touch operation on the screen of the control terminal, the control terminal senses change of pressure on the screen through a built-in pressure sensing device, determines a location on the screen where the pressure changes, compares the determined location on the screen where the pressure changes and the region on the screen where the second option is located, if the determined location on the screen where the pressure changes overlaps with the region on the screen where the second option is located, determines that the second option in the control terminal is triggered.

In step 302, the control terminal sends the state switching instruction to the target device.

In the present embodiment, the target device can be an air purifier or the like, which has an ability to communicate with other devices via a radio frequency method or a network.

Since the control terminal generates a state switching instruction to control the state switching of the target device, after it is detected that the state switching instruction is generated, the control terminal can send the generated state switching instruction to the target device for the target device to switch the state based on the state switching instruction. Depending on the communication ability of the target device and the control terminal, the control terminal can send the state switching instruction to the target device by enabling a Blue Tooth function or the like, or send the state switching instruction to the target device over a wired or wireless network.

In step 303, the target device switches the current state from the in-operation state to the out-of-operation state based on the state switching instruction.

When it receives the state switching instruction sent from the control terminal, the target device which is under the in-operation state switches the current state from the in-operation state to the out-of-operation state based on the received state switching instruction.

In the above example, the target device switches the current state from the in-operation state to the out-of-operation state based on the state switching instruction sent from the control terminal. However, in practical application, the target device can also acquire a state switching instruction by other means. For example, when a micro-switch on the target device is triggered, the micro-switch can generate a trigger signal, and send the generated trigger signal to the target device. When it receives the trigger signal sent from the micro-switch, the target device can generate a state switching instruction based on the trigger signal. For another example, when a particular component on the target device (such as a fan blade) is removed, a sensor on the target device can detect that the particular component is removed, generate a detection signal and send the detection signal to the target device. Based on a relationship between the signal and an instruction, the target device can generate a state switching instruction. For still another example, when it is detected that a first option on the target device is triggered, the target device can also generate a state switching instruction under the trigger of the first option.

After the target device switches the current state from the in-operation state to the out-of-operation state based on the state switching instruction, in order to timely prompt the user, the target device can play a particular audio file, to emit a sound different from that emitted by the target device under a normal in-operation state. Thus, when he or she hears the particular audio file played by the target device, the user can learn that the target device is currently in the out-of-operation state.

In addition, in the present embodiment, whichever state the target device is in, the target device can send a state data indicating its state to a server to keep the server updated for the inquiry of the user. Thus, after the target device switches the current state from the in-operation state to the out-of-operation state based on the state switching instruction, the target device can send state information to the server which indicates that it is in the out-of-operation state, and the server stores the status data.

In step 304, while in the out-of-operation state, the target device sends a state prompt message to a control terminal of the target device.

When the target device is in the out-of-operation state, in order to further prompt the user, the target device can not only prompt the user by playing a particular audio file, but also can send a prompt message to the control terminal of the target device. Thereby, even if he or she is in a place far away from the target device that he or she cannot hear the particular audio file played by the target device, the user can nevertheless learn that the target device is in the out-of-operation state.

In step 305, when it receives the state prompt message sent from the target device, the control terminal prompts based on the state prompt message.

When it receives the state prompt message sent from the target device, the control terminal can display the prompt message sent from the target device on a display interface. The contents of the prompt message can be "Please note that the target device is currently in the out-of-operation state", or "A particular component of the target device is removed', and the like. Specifically, for the display manner, the control terminal can pop out a dialog box on the screen, or can display the prompt message in a rolling way, and so on.

In step 306, the control terminal generates a predetermined wakening instruction.

When the target device is in the out-of-operation state, if he or she wants the target device to get back to the in-operation state, the user can trigger a fourth option in the control terminal, and when it detects that the fourth option is triggered, it can generate a predetermined wakening instruction.

However, the user can also trigger a fifth option in the designate application program of the control terminal, such that the control terminal pops out an unlocking dialog box for the user to input unlocking information on the screen. When the control terminal acquires the unlocking information in the designated application program, the control terminal can generate a predetermined wakening instruction based on the unlocking information. The unlocking information can be an unlocking password, a fingerprint of the user or the like which is previously set. The target device in the out-of-operation state can be unlocked based on the unlocking information. In case where the unlocking information is an unlocking password, the control terminal can match the password acquired through the unlocking dialog box with a pre-stored password. If the password acquired through the unlocking dialog box matches the pre-stored password, the control terminal can generate a predetermined wakening instruction. In case where the unlocking information is a fingerprint of the user, the control terminal can match the fingerprint acquired through the unlocking dialog box with a pre-stored fingerprint. If the fingerprint acquired through the unlocking dialog box matches the pre-stored fingerprint, the control terminal can generate a predetermined wakening instruction.

In step 307, the control terminal sends the predetermined wakening instruction to the target device.

In order for the target device in the out-of-operation state to normally operate, after the predetermined wakening instruction is generated, the control terminal can also send the generated predetermined wakening instruction to the target device. Since both of the control terminal and the target device have communication capability via a radio frequency method of over a wired or wireless network, the control terminal can enable the Blue Tooth function and send the predetermined wakening instruction to the target device, or send the predetermined wakening instruction to the target device over the wired or wireless network.

In step 308, the target device switches a current state from an out-of-operation state to an in-operation state based on the predetermined wakening instruction.

When it receives the predetermined wakening instruction sent from the control terminal, the target device in the out-of-operation state can switch the current state back to the in-operation state based on the predetermined wakening instruction.

In the above example, the target device switches the current state from the out-of-operation state to the in-operation state based on the predetermined wakening instruction sent from the control terminal. However, in practical application, the target device can also acquire a predetermined wakening instruction by other means. For example, the target device can also generate a predetermined wakening instruction when it detects that the user triggers a third option. Detecting that the third option on the target device is triggered can include following scenarios: the target device detects that the user presses down the third option on the target device; the target device detects that the user presses down the third option on the target device in a particular manner, or the like. The third option can be a particular button or a combination of buttons on the target device. Pressing down the third option on the target device in a particular manner can be pressing down the third option for a predetermined number times such as 3 times, 4 times, and so on, or pressing down the third option for a predetermined time period such as 3 seconds, 5 seconds and so on. For another example, when it determines that a removed particular component has been properly assembled, the target device can also generate a predetermined wakening instruction. However, the target device can also acquire a predetermined wakening instruction by other means, which will not be elaborated herein.

It should be noted that, when the target device is in the out-of-operation state, the target device will be remained in the out-of-operation state unless it acquires the predetermined wakening instruction, regardless which operating instruction is received.

In the method provided by the embodiment of the present disclosure, after the target device switches a current state from an in-operation state to an out-of-operation state based on the state switching instruction, the target device will be maintained in the out-of-operation state unless it acquires a predetermined wakening instruction, regardless which operating instruction is received. Thereby, it can avoid the situation where the target device is switched back to the in-operation state without an intended operation of the user and a family member of the user gets injured by the target device. Thus, the security in use of the target device can be improved. In addition, in the out-of-operation state, the target device will switch the out-of-operation state to the in-operation state when acquiring the predetermined wakening instruction, thus enriching the state switching manner.

Figure 4:
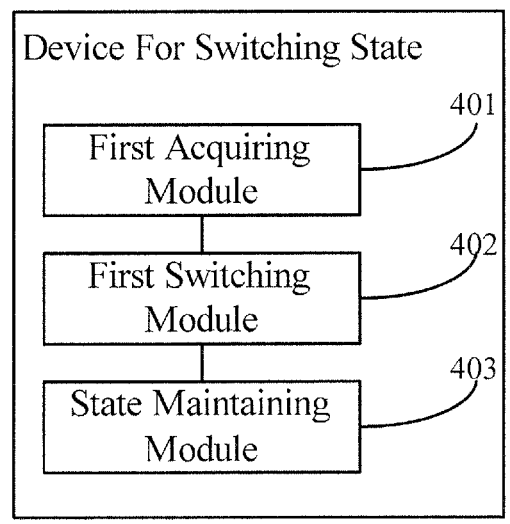
FIG. 4 is a block diagram of an apparatus for switching a state according to an exemplary embodiment.

FIG. 4 is a block diagram of an apparatus for switching a state according to an exemplary embodiment, which is included in a target device. As shown in FIG. 4, the apparatus includes a first acquiring module 401, a first switching module 402 and a state maintaining module 403.

The first acquiring module 401 is configured to acquire a state switching instruction. The first switching module 402 is configured to switch a current state of the target device from an in-operation state to an out-of-operation state based on the state switching instruction. The state maintaining module 403 is configured to maintain the out-of-operation state until a predetermined wakening instruction is acquired.

In another embodiment of the present disclosure, the first acquiring module 401 is configured to receive a trigger signal which is sent from a micro-switch on the target device when the micro-switch on the target device is triggered, and generate a state switching instruction based on the trigger signal. Alternatively, the first acquiring module 401 is configured to receive a detection signal which is sent from a sensor on the target device when the sensor detects that a particular component of the target device is removed, and generate a state switching instruction based on a relationship between the instruction and the signal. Alternatively, the first acquiring module 401 is configured to generate a state switching instruction when it is detected that a first option on the target device is triggered. Alternatively, the first acquiring module 401 is configured to receive a state switching instruction which is sent from a control terminal of the target device when the control terminal of the target device detects that a second option in the control terminal of the target device is triggered.

In another embodiment of the present disclosure, the apparatus further includes a playing module. The playing module is configured to play a particular audio file for prompting a user that the target device is currently in the out-of-operation state.

In another embodiment of the present disclosure, the apparatus further includes a first sending module. The first sending module is configured to send state information which indicates that the target device is currently in the out-of-operation state to a server, for the server to store the state information.

In another embodiment of the present disclosure, the apparatus further includes a second sending module. The second sending module is configured to send a state prompt message to a control terminal of the target device, for the control terminal to prompt based on the state prompt message.

In another embodiment of the present disclosure, the apparatus further includes a second acquiring module and a second switching module. The second acquiring module is configured to acquire a predetermined wakening instruction. The second switching module is configured to switch a current state from the out-of-operation state to the in-operation state based on the predetermined wakening instruction.

In another embodiment of the present disclosure, the second acquiring module is configured to generate a predetermined wakening instruction when it is detected that a third option on the target device is triggered. Alternatively, the second acquiring module is configured to receive a predetermined wakening instruction sent from the control terminal of the target device, the predetermined wakening instruction being generated by the control terminal based on unlocking information input by a user. Alternatively, the second acquiring module is configured to receive a predetermined wakening instruction which is sent from the control terminal of the target device when the control terminal of the target device detects that a fourth option in the control terminal of the target device is triggered.

In the apparatus provided by the embodiments of the present disclosure, after a current state is switched from an in-operation state to an out-of-operation state based on the state switching instruction, the out-of-operation state is maintained unless a predetermined wakening instruction is acquired, regardless which operating instruction is received. Thereby, it can avoid the situation where the target device is switched back to the in-operation state without an intended operation of the user, and a family member of the user gets injured by the target device. Thus, the security in use of the target device can be improved.

With respect to the apparatuses in the above embodiments, the specific manners for performing operations for individual modules therein have been described in detail in the embodiments regarding the relevant methods, which will not be elaborated herein.

Figure 5:
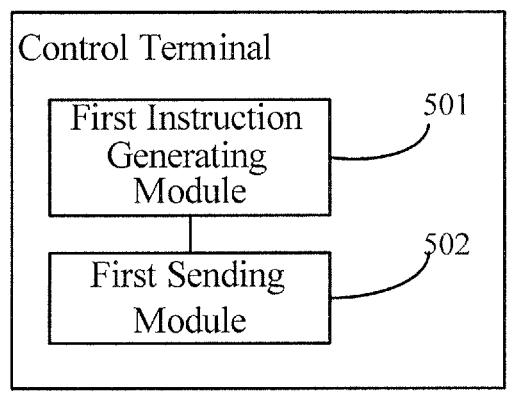
FIG. 5 is a block diagram of a control terminal according to an exemplary embodiment.

FIG. 5 is a block diagram of a control terminal according to an exemplary embodiment. As shown in FIG. 5, the control terminal includes a first instruction generating module 501 and a first sending module 502.

The first instruction generating module 501 is configured to generate a state switching instruction when it is determined that a second option in the control terminal is triggered. The first sending module 502 is configured to send the state switching instruction to a target device such that the target device switches a current state from an in-operation state to an out-of-operation state based on the state switching instruction.

In another embodiment of the present disclosure, the control terminal further includes a receiving module and a prompting module. The receiving module is configured to receive a state prompt message sent from the target device. The prompting module is configured to prompt based on the state prompt message.

In another embodiment of the present disclosure, the control terminal further includes a second instruction generating module and a second sending module. The second instruction generating module is configured to generate a predetermined wakening instruction when unlocking information input by a user is acquired or when it is determined that a fourth option in the control terminal of the target device is triggered. The second sending module is configured to send the predetermined wakening instruction to the target device such that the target device switches a current state from the out-of-operation state to the in-operation state based on the predetermined wakening instruction.

In the control terminal provided by the embodiments of the present disclosure, a state switching instruction is generated when it is determined that a particular option is triggered, and the generated state switching instruction is sent to a target device, for the target device to switch a current state from an in-operation state to an out-of-operation state based on the state switching instruction. In addition, in the out-of-operation state, the target device will be maintained in the out-of-operation state unless it acquires a predetermined wakening instruction, regardless which operating instruction is received. Thereby, it can achieve the control of the state of the target device by means of the control terminal, and the state switching manner can be enriched. Moreover, it can avoid the situation where the target device is switched back to the in-operation state without an intended operation of the user and a family member of the user gets injured by the target device. Thus, the security in use of the target device can be improved.

With respect to the control terminals in the above embodiments, the specific manners for performing operations for individual modules therein have been described in detail in the embodiments regarding the relevant methods, which will not be elaborated herein.

Figure 6:
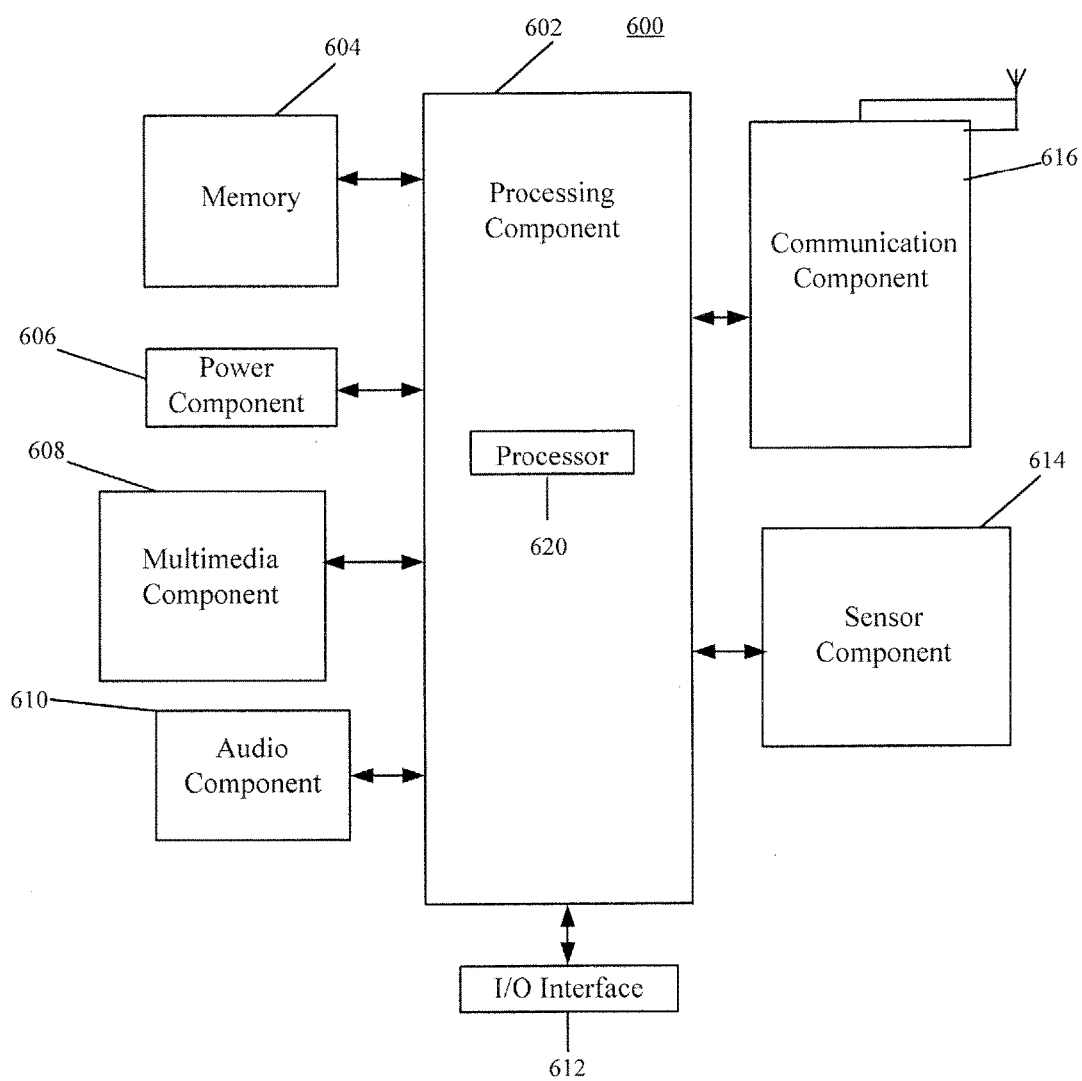
FIG. 6 is a block diagram of an apparatus for switching a state according to an exemplary embodiment.

FIG. 6 is a block diagram of a device 600 for switching a state according to an exemplary embodiment. For example, the device 600 may be a mobile phone, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like.

The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of a smart device, causes the smart device to perform a method for switching a state. The method includes acquiring a state switching instruction, switching a current state from an in-operation state to an out-of-operation state based on the state switching instruction, and maintaining the out-of-operation state unless acquiring a predetermined wakening instruction.

In another embodiment of the present disclosure, acquiring a state switching instruction includes receiving a trigger signal which is sent from a micro-switch on the target device when the micro-switch on the target device is triggered, and generating a state switching instruction based on the trigger signal, or receiving a detection signal which is sent from a sensor on the target device when the sensor detects that a particular component of the target device is removed, and generating a state switching instruction based on a relationship between the instruction and the signal, or generating a state switching instruction upon detecting that a first option on the target device is triggered, or receiving a state switching instruction which is sent from a control terminal of the target device when the control terminal of the target device detects that a second option in the control terminal of the target device is triggered.

In another embodiment of the present disclosure, after switching a current state from an in-operation state to an out-of-operation state based on the state switching instruction, the method further includes playing a particular audio file for prompting a user that the target device is currently in the out-of-operation state.

In another embodiment of the present disclosure, after switching a current state from an in-operation state to an out-of-operation state based on the state switching instruction, the method further includes sending state information which indicates that the target device is currently in the out-of-operation state to a server, for the server to store the state information.

In another embodiment of the present disclosure, after switching a current state from an in-operation state to an out-of-operation state based on the state switching instruction, the method further includes sending a state prompt message to a control terminal of the target device, for the control terminal to prompt based on the state prompt message.

In another embodiment of the present disclosure, after switching a current state from an in-operation state to an out-of-operation state based on the state switching instruction, the method further includes acquiring a predetermined wakening instruction, and switching a current state from the out-of-operation state to the in-operation state based on the predetermined wakening instruction.

In another embodiment of the present disclosure, acquiring a predetermined wakening instruction includes generating a predetermined wakening instruction upon detecting that a third option on the target device is triggered, or receiving a predetermined wakening instruction sent from the control terminal of the target device, the predetermined wakening instruction being generated by the control terminal based on unlocking information input by a user, or receiving a predetermined wakening instruction which is sent from the control terminal of the target device when the control terminal of the target device detects that a fourth option in the control terminal of the target device is triggered.

In the non-transitory computer-readable storage medium provided by the embodiments of the present disclosure, after a current state is switched from an in-operation state to an out-of-operation state based on the state switching instruction, the out-of-operation state is maintained unless a predetermined wakening instruction is acquired, regardless which operating instruction is received. Thereby, it can avoid the situation where the target device is switched back to the in-operation state without an intended operation of the user, and a family member of the user gets injured by the target device. Thus, the security in use of the target device can be improved.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for switching an operational state of an air moving device, comprising:
    acquiring a state switching instruction based on an input from a micro-switch of the air moving device;
    switching a current state of the air moving device from an in-operation state to an out-of-operation state based on the state switching instruction;
    maintaining the air moving device in the out-of-operation state until acquiring a predetermined wakening instruction wherein the predetermined wakening instruction is generated when a match is determined between a user input and pre-stored information, and the out-of-operation state of the air moving device is maintained unless the predetermined wakening instruction is acquired regardless which operating instruction is received, wherein the out-of-operation state is triggered when a fan blade of the air moving device is removed;
    acquiring the predetermined wakening instruction; and
    switching the air moving device from the out-of-operation state to the in-operation state responsive to the acquired predetermined wakening instruction.

2. The method of claim 1, wherein acquiring the state switching instruction comprises:
    receiving a trigger signal from the micro-switch on the air moving device when the micro-switch on the air moving device is triggered, and generating a state switching instruction based on the trigger signal; or
    generating a state switching instruction upon detecting that a first option on the air moving device is triggered.

3. The method of claim 1, wherein acquiring the state switching instruction comprises
    receiving a detection signal from a sensor on the air moving device when the sensor detects that a particular component of the air moving device is removed, and generating a state switching instruction based on the detection signal.

4. The method of claim 1, wherein acquiring the state switching instruction comprises
    receiving a state switching instruction which is sent from a control terminal of the air moving device when the control terminal of the air moving device determines that a second option in the control terminal of the air moving device is triggered.

5. The method of claim 1, wherein switching the current state from the in-operation state to the out-of-operation state based on the state switching instruction comprises:
    playing a particular audio file for prompting a user that the air moving device is currently in the out-of-operation state.

6. The method of claim 1, wherein switching the current state from the in-operation state to the out-of-operation state based on the state switching instruction comprises:
    sending state information indicating that the air moving device is currently in the out-of-operation state to a server.

7. The method of claim 1, wherein switching the current state from the in-operation state to the out-of-operation state based on the state switching instruction comprises:
    sending a state prompt message to a control terminal of the air moving device, the control terminal prompting based on the state prompt message.

8. The method of claim 1, wherein acquiring the predetermined wakening instruction comprises:
    generating a predetermined wakening instruction upon detecting that a third option on the air moving device is triggered; or
    receiving a predetermined wakening instruction sent from a control terminal of the air moving device, the predetermined wakening instruction being generated by the control terminal based on unlocking information input by a user.

9. The method of claim 1, wherein acquiring the predetermined wakening instruction comprises:
    receiving a predetermined wakening instruction from a control terminal of the air moving device when the control terminal of the air moving device detects that a fourth option in the control terminal of the air moving device is triggered.

10. A method for switching a state of an air moving device by a control terminal, comprising:
    generating a state switching instruction upon detecting that a second option in the control terminal is triggered;
    sending the state switching instruction to the air moving device, a current state of the air moving device being switched from an in-operation state to an out-of-operation state based on the state switching instruction;
    receiving a state prompt message sent from the air moving device;
    prompting based on the state prompt message;
    generating a predetermined wakening instruction upon acquiring unlocking information input by a user or upon detecting that a fourth option in the control terminal of the air moving device is triggered wherein the predetermined wakening instruction is generated when a match is determined between the user input and pre-stored information, and the out-of-operation state of the air moving device is maintained unless the predetermined wakening instruction is acquired regardless which operating instruction is received, wherein the out-of-operation state is triggered when a fan blade of the air moving device is removed; and
    sending the predetermined wakening instruction to the air moving device, the air moving device switching from the out-of-operation state to the in-operation state based on the predetermined wakening instruction.

11. An apparatus for switching a state of a target device with a fan, comprising:
    a module having one or more processors to execute instructions that is configured to acquire a state switching instruction based on a sensor of the target device, the sensor detecting a component of the air moving device being removed;
    a module having one or more processors to execute instructions that is configured to switch a current state of the target device from an in-operation state to an out-of-operation state based on the state switching instruction;
    a module having one or more processors to execute instructions that is configured to maintain the out-ofoperation state until acquiring a predetermined wakening instruction wherein the predetermined wakening instruction is generated when a match is determined between a user input and pre-stored information, and the out-of-operation state of the target device is maintained unless the predetermined wakening instruction is acquired regardless which operating instruction is received, wherein the out-of-operation state is triggered when a fan blade of the air moving device is removed;

a module having one or more processors to execute instructions that is configured to acquire the predetermined wakening instruction; and a module having one or more processors to execute instructions that is configured to switch the target device from the out-of-operation state to the in-operation state responsive to the acquired predetermined wakening instruction.

12. The apparatus of claim 11, wherein the module configured to acquire the state switching instruction is further configured to:

receive a trigger signal from a micro-switch on the target device when the micro-switch on the target device is triggered, and generating a state switching instruction based on the trigger signal; or generate a state switching instruction upon detecting that a first option on the target device is triggered.

13. The apparatus of claim 11, wherein the module configured to acquire the state switching instruction further configured to:

receive a detection signal from the sensor on the target device when the sensor detects that a particular component of the target device is removed, and generate a state switching instruction based on the signal.

14. The apparatus of claim 11, wherein the module configured to acquire the state switching instruction further configured to:

receive a state switching instruction from a control terminal of the target device when the control terminal of the target device detects that a second option in the control terminal of the target device is triggered.

15. The apparatus of claim 11, wherein the module configured to switch the current state from the in-operation state to the out-of-operation state based on the state switching instruction is further configured to:

play a particular audio file related to the out-of-operation state.

16. The apparatus of claim 11, wherein the module configured to switch the current state from the in-operation state to the out-of-operation state based on the state switching instruction is further configured to:

send state information indicating that the target device is currently in the out-of-operation state to a server.

17. The apparatus of claim 16, wherein the module configured to acquire the predetermined wakening instruction is further configured to:

generate a predetermined wakening instruction upon detecting that a third option on the target device is triggered; or receive a predetermined wakening instruction sent from a control terminal of the target device, the predetermined wakening instruction being generated by the control terminal based on unlocking information input by a user.

18. The apparatus of claim 16, wherein the module configured to acquire the predetermined wakening instruction is further configured to:

receive a predetermined wakening instruction from a control terminal of the target device when the control terminal of the target device detects that a fourth option in the control terminal of the target device is triggered.

19. The apparatus of claim 11, wherein the module configured to switch the current state from the in-operation state to the out-of-operation state based on the state switching instruction is further configured to:

send a state prompt message to a control terminal of the target device such that the control terminal prompts based on the state prompt message.

20. A control terminal, comprising:

a module having one or more processors to execute instructions that is configured to generate a state switching instruction upon detecting that a second option in the control terminal is triggered;

a module having one or more processors to execute instructions that is configured to send the state switching instruction to a target device, a current state of the target device being switched from an in-operation state to an out-of-operation state based on the state switching instruction;

a module having one or more processors to execute instructions that is configured to receive a state prompt message sent from the target device;

a module having one or more processors to execute instructions that is configured to prompt based on the state prompt message;

a module having one or more processors to execute instructions that is configured to generate a predetermined wakening instruction upon acquiring unlocking information input by a user or upon detecting that a fourth option in the control terminal of the target device is triggered wherein the predetermined wakening instruction is generated when a match is determined between the user input and pre-stored information, and the out-of-operation state of the target device is maintained unless the predetermined wakening instruction is acquired regardless which operating instruction is received, wherein the out-of-operation state is triggered when a fan blade of the air moving device is removed; and a module having one or more processors to execute instructions that is configured to send the predetermined wakening instruction to the target device, the target device switching from the out-of-operation state to the in-operation state based on the predetermined wakening instruction.

* * * * *